US011429881B1

(12) United States Patent
Wu et al.

(10) Patent No.: US 11,429,881 B1
(45) Date of Patent: Aug. 30, 2022

(54) PERSONALIZED GROUPING OF TRAVEL DATA FOR REVIEW THROUGH A USER INTERFACE

(71) Applicant: INTUIT INC., Mountain View, CA (US)

(72) Inventors: Grace Wu, Mountain View, CA (US); Shashank Shashikant Rao, Mountain View, CA (US); Susrutha Gongalla, Mountain View, CA (US); Ngoc Nhung Ho, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 353 days.

(21) Appl. No.: 16/510,195

(22) Filed: Jul. 12, 2019

Related U.S. Application Data

(60) Provisional application No. 62/697,316, filed on Jul. 12, 2018.

(51) Int. Cl.
*G06N 20/00* (2019.01)
*G06F 16/28* (2019.01)
*G06N 5/04* (2006.01)
*G06F 9/451* (2018.01)

(52) U.S. Cl.
CPC .............. *G06N 5/04* (2013.01); *G06F 9/451* (2018.02); *G06F 16/285* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,301,533 B1 * | 10/2001 | Markow | .............. | G07C 5/0858 340/438 |
| 2008/0030376 A1 * | 2/2008 | Tunnell | .................. | G07C 5/085 340/988 |
| 2012/0023045 A1 * | 1/2012 | Steck | ..................... | G06N 20/00 706/12 |
| 2014/0022096 A1 * | 1/2014 | Agarwal | ............ | G01C 21/3617 340/995.27 |
| 2015/0080030 A1 * | 3/2015 | Moldavsky | ............. | H04W 4/20 455/456.3 |
| 2015/0286645 A1 * | 10/2015 | Sinha | .................. | G06F 16/9535 707/734 |

(Continued)

*Primary Examiner* — Henry Orr
(74) *Attorney, Agent, or Firm* — Patterson & Sheridan, LLP

(57) ABSTRACT

Certain aspects of the present disclosure provide techniques for providing personalized groups of travel data for review through a user interface. Embodiments include receiving trip records associated with a user from an application running on a remote device, providing the trip records to a prediction model, and receiving a plurality of groups from the prediction model, each group of the plurality of groups comprising a subset of the trip records. Embodiments include providing each group of the plurality of groups to a personalization model, the personalization model having been trained based on user feedback to determine personalization scores for each group of the plurality of groups. Embodiments include receiving a personalization score for each group of the plurality of groups from the personalization model and transmitting one or more groups selected based on the personalization scores to the application to be displayed via the user interface.

20 Claims, 7 Drawing Sheets

(56) References Cited

U.S. PATENT DOCUMENTS

| | | | |
|---|---|---|---|
| 2017/0099582 A1* | 4/2017 | Boesen | H04W 4/029 |
| 2017/0154389 A1* | 6/2017 | Bashvitz | G06Q 50/14 |
| 2018/0018734 A1* | 1/2018 | Ho | G06Q 40/06 |
| 2019/0095785 A1* | 3/2019 | Sarkar | G06N 20/00 |

\* cited by examiner

PERSONALIZED GROUPING OF TRAVEL DATA FOR REVIEW THROUGH A USER INTERFACE

RELATED APPLICATIONS

This application claims the benefit of U.S. Provisional Application No. 62/697,316, entitled "PERSONALIZED GROUPING OF TRAVEL DATA FOR REVIEW THROUGH A USER INTERFACE," by the same inventors, filed 12 Jul. 2018, the contents of which are incorporated herein in their entirety.

INTRODUCTION

Aspects of the present disclosure relate to personalized grouping of travel data for review through a user interface.

A common business task is accounting for expenses, such as those related to travel. For example, an individual may use their car for business purposes and subsequently assess that use (including, for example, maintenance, gas, and wear and tear) as an expense against any business income attributable to the use (i.e., "write it off"). In some tax systems, the individual may have to track, collect, and report such business expenses on a regular basis, such as in quarterly or yearly tax filings.

In some tax systems, individuals are given two options for deducting business use vehicle expenses from their related business income. First, the individual may track actual vehicle-related costs (e.g., with gas and maintenance receipts, etc.) and deduct such costs. Second, an individual may track the number of miles driven for business purposes and apply a standard formula (e.g., 54 cents for every mile driven) that converts that mileage into a total deductible expense. For the latter, most individuals use odometer readings to track mileage.

Whereas tracking trip mileage used to be a tedious, manual task, often done by hand, now software applications exist that allow users to actively track mileages and record trips automatically. For example, an individual may have a mobile device with a mobile application that leverages a GPS capability of the mobile device on which the application is running to track mileage automatically. While such a feature is undoubtedly more convenient than the conventional pen-and-paper approach, users of such software applications must still go through the time-consuming and error-prone task of reviewing each recorded trip and manually labeling it as either business related or personal (because personal trips may not be tax deductible).

Compounding the problem of manual labeling (i.e., classification) is that many jobs may require significant numbers of trips, which in-turn require significant amounts of manual labeling. For example, individuals driving personal vehicles for ride-sharing services, delivery services, and other similar vehicle-based services may have hundreds or even thousands of trips in a month to sort through and label. The size and character of the manual labeling task makes it one that promotes mistakes, if it is done at all. Furthermore, individuals may have different characteristics and preferences that make the process of reviewing and labeling data different for each individual. Conventional techniques of displaying trips for review and labelling do not take into consideration these characteristics and preferences, which may contribute to a poor user experience. For example, simply displaying trips in an arbitrary order or by date may make the review task inconvenient for individuals with different preferences. In fact, many individuals simply forgo the task either not realizing or simply accepting the fact that they are losing significant tax savings as a consequence.

Accordingly, what is needed is a way to intelligently group travel data for review through a user interface in a way that is personalized for individual users.

BRIEF SUMMARY

Certain embodiments provide a method for providing personalized groups of travel data to a user interface of an application. The method generally includes receiving trip records associated with a user from an application running on a remote device; providing the trip records to a prediction model; receiving a plurality of groups from the prediction model, wherein each group of the plurality of groups comprises a subset of the trip records; providing each group of the plurality of groups to a personalization model, wherein the personalization model has been trained based on user feedback to determine personalization scores for each group of the plurality of groups; receiving a personalization score for each group of the plurality of groups from the personalization model; selecting one or more groups of the plurality of groups to provide to the user based on the personalization score for each of the one or more groups; and transmitting the one or more groups to the application running on the remote device to be displayed via the user interface.

Other embodiments provide a non-transitory computer-readable medium comprising instructions that, when executed by one or more processors, cause the one or more processors to perform a method for providing personalized groups of travel data to a user interface of an application. The method generally includes receiving trip records associated with a user from an application running on a remote device; providing the trip records to a prediction model; receiving a plurality of groups from the prediction model, wherein each group of the plurality of groups comprises a subset of the trip records; providing each group of the plurality of groups to a personalization model, wherein the personalization model has been trained based on user feedback to determine personalization scores for each group of the plurality of groups; receiving a personalization score for each group of the plurality of groups from the personalization model; selecting one or more groups of the plurality of groups to provide to the user based on the personalization score for each of the one or more groups; and transmitting the one or more groups to the application running on the remote device to be displayed via the user interface.

Other embodiments provide a system comprising one or more processors and a non-transitory computer-readable medium comprising instructions that, when executed by the one or more processors, cause the one or more processors to perform a method for providing personalized groups of travel data to a user interface of an application. The method generally includes receiving trip records associated with a user from an application running on a remote device; providing the trip records to a prediction model; receiving a plurality of groups from the prediction model, wherein each group of the plurality of groups comprises a subset of the trip records; providing each group of the plurality of groups to a personalization model, wherein the personalization model has been trained based on user feedback to determine personalization scores for each group of the plurality of groups; receiving a personalization score for each group of the plurality of groups from the personalization model; selecting one or more groups of the plurality of groups to provide to the user based on the personalization score for each of the one or more groups; and transmitting the one or more groups to the application running on the remote device to be displayed via the user interface.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
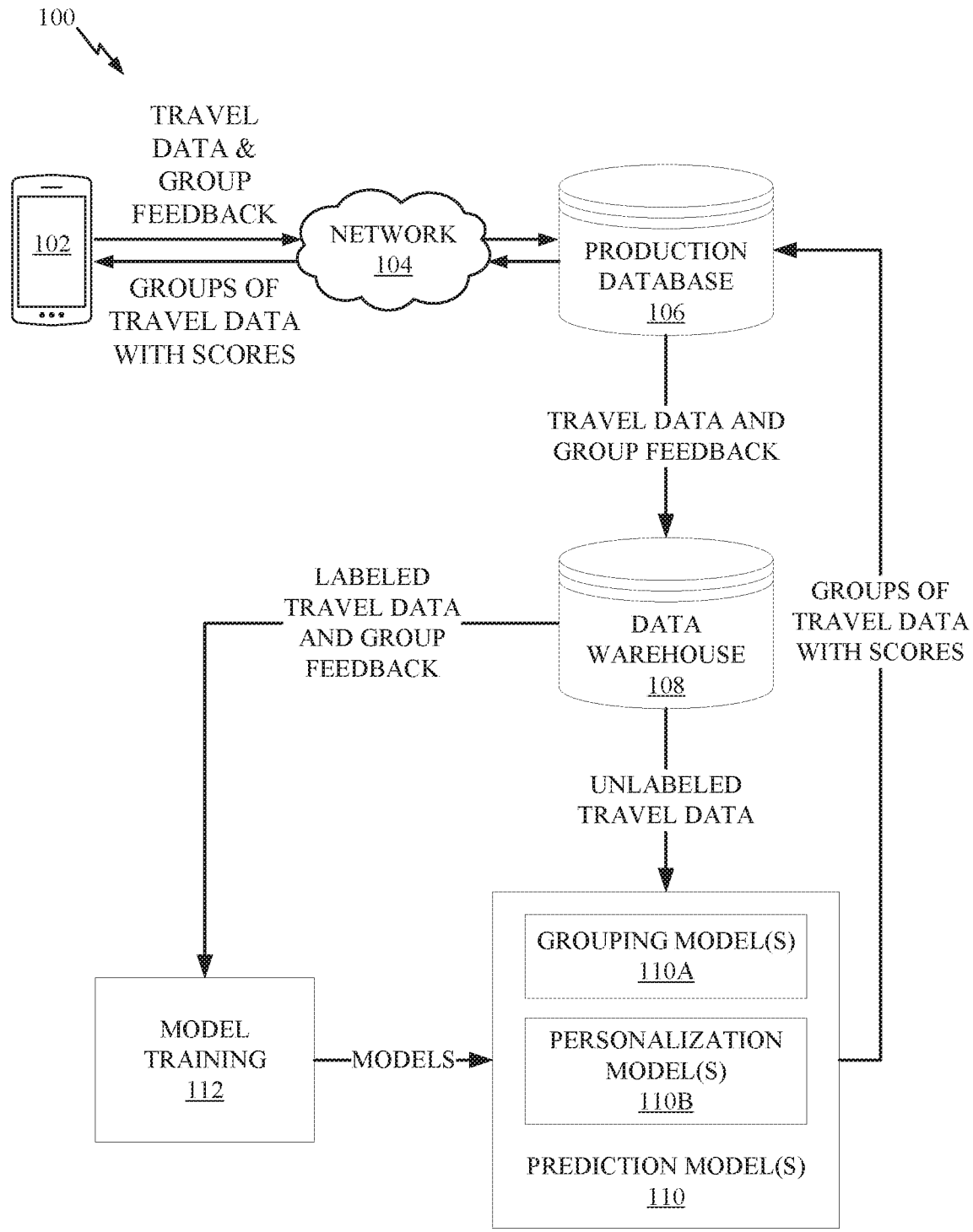
FIG. 1 depicts a system for providing personalized groups of travel data for review through a user interface.

Aspects of the present disclosure provide apparatuses, methods, processing systems, and computer readable mediums for providing personalized groups of travel data for review through a user interface.

Grouping travel data, such as trips taken in a vehicle, and presenting the groups to a user through an application user interface allows for the user to more quickly and efficiently label (i.e., classify) the travel data. For example, through such a user interface, a user may be able to label many trip records as business-related or personal with a single input. However, to be most useful, the grouping should be dynamic and personalized for particular users. This is because simple and static rules for presenting grouped travel data (e.g., trip records) to users may not work correctly within diverse populations of users. For example, different users (e.g., users that work in different industries or users with other different characteristics) may have different preferences regarding grouping criteria and which groups to review first. Therefore, embodiments described herein include user and multi-user grouping and personalization models that are trained on user-specific and multi-user specific data using machine learning techniques (e.g., personalization models may be trained based on multi-user data if a particular user has not provided sufficient feedback for training the personalization models based only on the user's data). The grouping models automatically group travel data (e.g., trip records) by predicted classes (e.g., business or personal). The personalization models automatically assign personalization scores to groups (e.g., after the personalization models have been trained using historical user feedback and/or user data from a particular user and/or plurality of users) so that groups may be selected for personalized presentation to users in a user interface of an application, such as a personal or business finance application. Further, in some embodiments, user feedback is collected based on the personalized groups, which is fed back to a training function so as to consistently and dynamically refine the grouping models and personalization models. In certain embodiments, grouping models and personalization models are collectively referred to as "prediction models".

Embodiments described herein represent many improvements over conventional methods. For example, providing personalized groups of travel data for review in a user interface provides for significantly faster, more targeted, and more comprehensive reviews as compared to conventional methods. Further, providing personalized groups of travel data based on tracked location data increases the accuracy and consistency of labeling (i.e., classification) as compared to conventional methods (e.g., due at least in part to the groups being targeted to users based user preferences and characteristics). Further yet, providing personalized groups travel data for review in a user interface improves the utilization of device resources, such as a screen real estate, and battery life (because the labeling can be completed much more efficiently as compared to conventional methods). For a user, the automatically personalized groupings of travel data may improve the consistency with which the labeling is completed and the accuracy of the labeling, which leads to more accurate tax filings and reduced taxes. Further, the intuitiveness and efficiency of the application user interface employing techniques for providing personalized groups of travel data may lead to higher application usage rates and more committed application users, which in-turn drives the accuracy of the prediction models due to the increase in user data usable for training and validation of the prediction models. The aforementioned are only a few of the improvements of conventional technologies, and other benefits will be apparent to those of skill in the art.

Example System Architecture for Grouping Travel Data

FIG. 1 depicts a system 100 for grouping travel data for group review through a user interface. System 100 includes production database 106, which receives travel data from users. For example, production database 106 may receive travel data in the form of trip records from an application running on a user device, such as mobile device 102 over network 104. In some examples, mobile application 102 may be a personal or business finance application that includes an automatic trip or mileage tracking function. In other examples, mobile application 102 may be a dedicated mileage tracking application.

Network 104 may be any sort of data communication network capable of carrying travel data from a user device, such as mobile device 102, to production database 106. For example, network 104 may be a local area network, wide area network, cellular network, ad-hoc network, near-field communication network, the Internet, or any other type of data sharing network capable of connecting electronic devices.

Mobile device 102 may be any form of electronic device capable of running applications and communicating data over a network interface. For example, mobile device 102 may be a smartphone, tablet computer, laptop computer, smart wearable device, autonomous or semi-autonomous vehicle, and other electronic devices capable of determining their location and communicating over a data network, such as network 104.

In some examples, production database 106 may receive travel data and user feedback regarding previously grouped travel data from a user device, such as mobile device 102, at regular intervals (e.g., once a day) or continuously (e.g., while the mobile application is running in the foreground or background). Alternatively, production database 106 may include an agent or other function that requests the travel data and/or user feedback from remote mobile applications, such as may be installed on mobile device 102.

The trip records received by and stored in production database 106 (e.g., from mobile device 102) may include, among other things, location data (e.g., in GPS or other location coordinates), such as starting and finishing locations and route locations. The trip records may also include times, which in some cases may be based on timestamps associated with the location data. Further the trip records may include various types of metadata, such as what type of vehicle the trip was made in, how much time elapsed during the trip, how much gas was used during the trip, and many others. The user feedback may include user interactions with groups of travel data (e.g., groups of trip records that have been previously predicted by grouping models and provided to the user for review), such as user input that indicates whether or not a user had a favorable impression of a group. For example, in some embodiments, all user interactions (e.g., clicks, classifying and providing of trip purposes for trips within the group) with groups are included in user feedback.

In some cases, the trip records may include label data (e.g., a trip type such as business or personal) when received by production database 106, such as when a user has already labeled the trip records. Other trip records may only include location data or may include location data and other ancillary data (e.g., type of vehicle) that is not necessarily determinative of trip type.

Travel data (such as trip records) and user feedback received by production database 106 may be stored in data warehouse 108. For example, a server housing production database 106 may be configured for speed and thread capacity (e.g., to handle traffic from many users), whereas data warehouse 108 may be hosted by a server configured for storage capacity and resiliency.

In the depicted example, labeled travel data and user feedback (e.g., regarding groups) arriving at data warehouse 108 by way of production database 106 may be sent to model training module 112 for purposes of training prediction model(s) 110, such as grouping and personalization models. In some examples, an agent of data warehouse 108 may automatically determine that newly received data is labeled (i.e., classified) with a type (e.g., business or personal) and may thereafter send the labeled travel data to model training module 112. In other examples, model training module 112 may periodically or continuously send requests to data warehouse 108 for new labeled travel data. In yet other examples, production database 106 may send labeled travel data to model training module 112 directly as well as sending the same travel data to data warehouse 108.

Model training module 112 is used to train one or more prediction models 110, such as grouping a personalization models, based on, for example, labeled travel data (e.g., trip records labeled as either business or personal) and user feedback regarding groups of travel data. Thus, training module 112 may perform, at least in part, supervised learning techniques to create prediction models 110. The labeled travel data (also referred to as ground truth travel data) and user feedback is therefore input to a machine learning process that creates prediction models 110.

Prediction models 110 include grouping models 110A that predict which travel data should be grouped together and personalization models 110B that predict which groups (e.g., of the groups output by grouping models 110A) are most likely to be of interest to a particular user (e.g., by assigning personalization scores to groups based on historical user feedback) so that the user may quickly label groups with a minimal input (e.g., a single interaction with a graphical user interface, such as clicking on one user interface element like a button). In some embodiments, certain groups are selected to provide to a particular user based on personalization scores of the groups that are output by the personalization models 110B. Groups of travel data (e.g., with personalization scores) are sent back to production database 106 so that they may be subsequently transmitted back to a user as personalized groups of travel data, such as back to the mobile application running on user device 102.

In some examples, each prediction model 110 is a user-specific prediction model based on labeled travel data and feedback from the user. In this way, prediction models 110 may be user-centric and thus flexible and adaptive to a wide variety of user types.

Personalization models 110B are trained based on user feedback from a particular user and/or a plurality of users to assign personalization scores to groups. A personalization score output by a personalization model 110B may be indicative of a degree to which a group of travel data corresponds to a particular user's characteristics and/or preferences. In some examples, model training module 112 may use supervised training methods, such as linear regression or random forest techniques, to train personalization models 110B that are user-specific or multi-user-specific. In certain embodiments, such as when a particular user has not provided sufficient feedback to train a personalization model based only on the user's feedback, a personalization model 110B may be trained using user feedback from other users that are similar to the particular user. For instance, model training module 112 may train the personalization model 110B with supplemental data about users, such as data available through the usage of an application for automatically tracking trips installed on mobile device 102, along with user feedback of the users. For example, in some embodiments, model training module 112 trains a personalization model 110B based on user characteristics, such as the industry in which the users work, if available (e.g., rideshare, real estate, consulting, construction, and other industries), and other user data (e.g., length of time using the application, number of business trips, job description, and other user data). As such, the personalization model 110B is able to assign personalization scores to groups based on user feedback of users that are similar to a user (e.g., users that share common characteristics).

In some embodiments, model training module 112 trains personalization models 110B based on whether or not user feedback is favorable to certain groups. User feedback may be considered favorable if it indicates that a user reviewed the group, such as any interaction by the user with the group (e.g., clicking on the group, assigning labels to the group, and other interactions), or that the user confirmed the grouping (e.g., if the user accepted a predicted label for all or most of the transactions in the group). In some embodiments, user feedback is considered unfavorable if it indicates that the user did not review the group or did not confirm the grouping (e.g., if the user assigned different labels than those predicted for all or most of the trips in the group). Each group may be associated with group criteria (e.g., the criteria by which the grouping of trip records was made, such as trip records with similar start and/or end locations, similar time of day, and other criteria, as well criteria about the group, such as a number of trips in the group and accuracy of the group, which may be determined based on whether or not the user confirms a predicted classification for the group), and user feedback for a particular group indicates a favorable or unfavorable impression of the group criteria of the group. For example, if a user provides favorable user feedback to a group that is based on a common end location, then model training module 112 uses the user feedback to train the personalization model 110B to assign a higher personalization score to groups that include the group criteria of a common end location. Model training module 112 may also train personalization models based on accuracy of groups. For example, if a user provides favorable user feedback (e.g., by interacting with the groups) to groups with a low accuracy (e.g., where the user does not confirm the predicted category for all or most of the trips in the group) but contain a large number of trips (e.g., groups with 50 or more trips), then model training module 112 may train a personalization model for the user to assign a lower weight to accuracy and a higher weight to groups with a large number of trips.

Personalization models 110B of prediction models 110 may, in some embodiments, include weighted scoring techniques. In some examples, a personalization model may include weights that are associated with features (e.g., group criteria) based on user feedback with respect to groups that include the features. Weights are automatically changed (i.e., tuned) through training of personalization models 110B by model training 112 as ongoing user feedback is received. For example, for a particular user, a weight may be assigned to a feature based on how often the user interacts positively (e.g., based on user feedback indicating the user reviewed a group or confirmed predictions regarding a group) with groups that are associated with the feature. The personalization model 110B determines a personalization score for a group by calculating the sum of each feature of the group multiplied by its associated weight. For example, the determining a personalization score could include the calculation of $y=w_1*p_1+w_2*p_2+w_3*p_3+ \ldots w_n*p_n$, where y is the personalization score, $p_1$ through $p_n$ are 'n' features of the group, and $w_1$ through $w_n$ are weights associated with the features. It is noted that weighted scoring is only included as one example, and other techniques for determining personalization scores are possible.

In some examples, users are enabled to manually change or tune the weights. For example, users may be able to select group criteria that they prefer and adjust the weights of each of the group criteria. This may provide users with more direct control over groups that are provided to them. For instance, users may specify group preferences via the user interface of the application, and the group preferences may be used by model training module 112 to train personalization models of prediction models 110.

Grouping models of prediction models 110 receive unlabeled travel data as input from data warehouse 108 and output predicted groups of the travel data. For example, a grouping model may receive a set of unlabeled trip records from data warehouse 108 and determine that a first subset of the set are predicted to be business trips and a second subset of the set are predicted to be personal trips. The grouping model may also output a third subset of the set for undetermined trip records (e.g., where the record cannot confidently be predicted as either business or personal). Notably, in this example "business" and "personal" are the labels predicted by the grouping model, but in other examples there may be more labels and different labels as compared to this example.

Personalization models of prediction models 110 receive the predicted groups output by the grouping models and output personalization scores for each of the predicted groups. In some instances, personalization models also receive supplementary data associated with a particular user along with the predicted groups in order to determine personalization scores for the groups that are specific to the particular user. For example, a personalization model may output personalization scores for a set of groups, and the personalization scores may be used to determine which groups to provide to the user and/or which order to display the groups in. In certain embodiments, personalization scores are used to determine whether to provide a group to a user separately from the application, such as via a push notification, an email, a text message, or another form of communication. For example, if a group has a personalization score above a certain threshold (e.g., indicating a high level of confidence that the group corresponds to the user's characteristics and/or preferences), a push notification may be provided to the home screen of a mobile device on which the user accesses the application, and the push notification may prompt the user to review the group. The use of personalization scores to determine which groups to present to a user and, in some cases, the method for presenting the groups to the user (e.g., within the application or through push notifications) may allow travel data to be presented to the user in a form that the user is most likely to prefer and promptly review. There are a vast number of ways in which travel data can be grouped (e.g., based on start or end location, time of day, order of occurrence, length of trips, and many other possible group criteria, and in groups that contain many different numbers of trips), and personalization scores assist in determining which types of groups to provide to particular users.

In some examples, prediction models 110 include types of supervised pattern matching algorithms such as Frequent Pattern Mining, aggregating trips frequency based on pre-set grouping criteria, etc. Using Frequent Pattern Mining, we can automatically discover patterns in trips taken by a user. For example, if a user always marks trips from location A to location B as business in the past 90 days, this will be stored as a pattern for this user and it will be used by grouping models 110A for automatically grouping all trips from location A to location B in the future as business trips. If a user always reviews groups with certain group features (e.g., groups with a certain number of trips or groups that are based on certain group criteria) first, this will be stored as a pattern for this user and it will be used by personalization models 110B for assigning higher personalization scores to groups with the certain group features in the future. These methodologies look for all possible patterns and identify any pattern that we might not be aware of for each individual user. Similarly, certain techniques involve only looking at pre-set patterns for a user. For example, techniques may involve only looking for patterns: "trips starting from location A and ending in location B", "trips occurring in the morning over weekdays", "trips occurring over weekend", or trips that were labeled with the same purpose, such as driving for a ride share business or a real estate agency, etc. In this case, these patterns can be systematically identified in a user's trips data and the patterns with most number of trips can be used for grouping new trips taken in the future and assigning personalization scores to groups. In certain embodiments, clustering algorithms are used by one or more prediction models 110 that assign trips to groups. Other types of traditional classification models such as a Naïve Bayes classification model, logistic regression, decision tree, random forest, gradient-boosted tree, multilayer perceptron, and others may also be used as a prediction model 110. A Naïve Bayes classification model is based on the concept of dependent probability i.e., what is the chance of some outcome given some other outcome. A logistic regression model takes some inputs and calculates the probability of some outcome, and the label may be applied based on a threshold for the probability of the outcome. For example, if the probability is >50% then the label is A, and if the probability is <=50%, then the label is B. A decision tree makes a classification by dividing the inputs into smaller classifications (at nodes), which result in an ultimate classification at a leaf. A random forest extends the concept of a decision tree model, except the nodes included in any give decision tree within the forest are selected with some randomness. Thus, random forests may reduce bias and group outcomes based upon the most likely positive responses. Gradient boosting is a method for optimizing decision-tree based models In some cases, one or more of production database 106, data warehouse 108, prediction model 110, and model training module 112 may be resident, individually or collectively, on one or more servers. For example, in some cases production database 106 is resident on an external network facing server, while data warehouse 108 is on a non-externally accessible server. Further, model training module 112 and prediction model 110 may be resident on special-purpose, high-performance servers in data communication with production database 106 and data warehouse 108.

Notably FIG. 1 is depicted with a selected group of features for clarity and simplicity, but there may be many additional elements of system 100. For example, production database 106 may be behind a firewall and accessible only via a gateway or application programming interface (API).

System 100 for providing personalized groups of travel data has many uses, including, for example, providing personalized groups of trips for a personal or business finance application (mobile or desktop). As discussed above, this allows users of such applications to review trip records in groups of many at a time (i.e., in "bulk") that are targeted to particular users, which saves the users significant time and effort. Further, providing personalized groups of travel data via system 100 may allow for automatic identification and prioritization of high-value business trips for particular users so they can maximize their tax deductions.

The personalized groups can be used as the basis of suggested rules for users. For example, a suggested rule based on the personalized groups can be presented to a user (e.g., through a graphical user interface of mobile device 102) and the user can confirm or change the suggested rule before accepting. Such rules may then automatically be applied to future groups of trip records based on the criteria in the rule. For example, a rule may state "always group trips based on start location" or "always provide groups of ten trips." Thus, the initial personalized groups from prediction models 110 may further enhance the application by automating and personalizing rule generation per user, which in-turn further increase the efficiency of reviewing trip records.

The personalized groups generated by system 100 may also be used to improve the prediction models 110 because the predictions can generate user feedback as to the correctness of the grouping and personalization (e.g., through AB testing). Improvements could include re-prioritizing the criteria used for grouping and assigning personalization scores, and tuning the algorithm used for identifying trip patterns, as just a few examples. For example, if a user always ignored groups based on a certain criteria such as start location, model training module 112 may use that feedback as an input for training prediction models 110, which may result in the certain criteria no longer being used or being used less frequently for grouping and/or personalization. Furthermore, user feedback regarding groups leads to improved personalization scores for future groups, which improves the selection of groups for display to the user and the order in which groups are displayed, thereby allowing grouped travel data to be reviewed more efficiently and effectively.

Example Process Flow for Providing Personalized Groups of Travel Data

Figure 2:
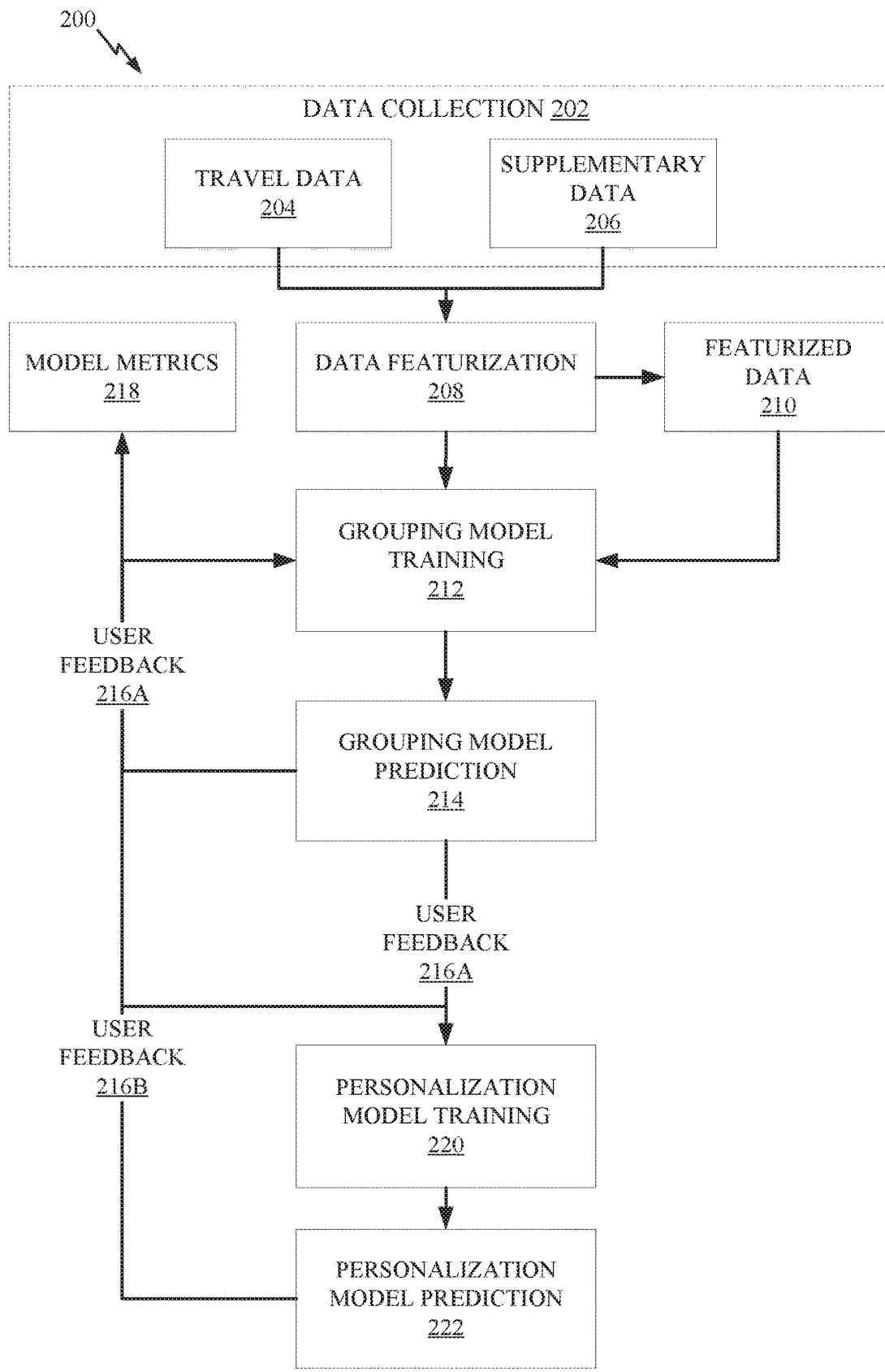
FIG. 2 depicts a process flow for providing personalized groups of travel data for review through a user interface.

FIG. 2 depicts a process flow 200 for providing personalized groups of travel data to users of an application. Process 200 begins with data collection step 202. For example, travel data 204 may be collected from users, such as from applications running on user devices, as described above with respect to FIG. 1. Travel data may include trip records that include, for example, location coordinates (e.g., GPS coordinates) for starting and ending points of a trip as well as time data (e.g., start and end time of a trip). As described above, travel data may also include other metadata about the trip.

Other, supplementary data 206 may also be collected to improve the training of grouping models and personalization models in step 212. For example, supplementary data 206 may include: user-specific data, such as a user's industry or login behavior; travel metadata, such as location names (as provided through map APIs or other models); and other types of data that is related to users and trips performed by users.

The data collected during data collection step 202, such as travel data 204 and supplementary data 206 may be featurized in data featurization step 208. Featurization may include an ensemble of data preparation and transformation steps to remedy inherent issues in large data sets, such as inconsistent data sources, missing values, inconsistent or incompatible data types (e.g., structure/categorical, unstructured, time series, etc.), noisy or dirty data, skewed data, and other known issues. Further, transformations included as part of data featurization 208 may better prepare the data for use with machine learning techniques. Example transformation techniques include: normalization or standardization, categorization, dummification of categorical variables, binning, dimensionality reduction, filtering, new feature creation based on formulas, feature hashing, natural language processing (NLP), token annotation, bag-of-words vectorization, sentence annotation, speech element identification, lemmatization or stemming, and others.

In the context of the travel data, featurization may include transformations such as extracting time of day, day of week, etc. from a timestamp of when a trip started or ended, distance travelled in one trip based on start location and end location, and getting more coarse location coordinates based on more fine grained ones. For example, if there are different locations where someone parks their car around their home, they can all be considered as one location within a bigger radius around their home.

Further, featurization may include predicting "hot spots", which are defined region (e.g., encompassing a plurality of locations) that are associated with certain classification data and/or other descriptive data that assists in classifying future trips with origin locations or destination locations that fall within the hot spot. By way of example, a hot spot may encompass a region such as a city block, neighborhood, entire town, or other regions that a given user may frequent for a particular purpose. Methods for predicting and using hot spots are described in Applicant's co-pending U.S. application Ser. No. 15/913,812, filed Mar. 6, 2018, which is hereby incorporated by reference in its entirety.

While data featurization 208 and grouping model training 212 are shown as distinct steps in process 200 in FIG. 2, this is only one example. Other processes, such as deep learning, may effectively combine these individual process steps, e.g., by learning features and the grouping models together.

Data that is featurized at step 208 is stored in a featurized data repository at step 210 in addition to be used for grouping model training at step 212.

Grouping model training 212 takes data from data featurization 208 and/or from stored featurized data 210 and partitions the featurized data into, for example, training data sets, which may include a range of data prior to a set date, as well as a test data set, which may include a range of data after the set date. For example, test data may comprise featurized data from three months prior to a set date and test data may comprise featurized data from a week to a few weeks (e.g., one to four weeks) after the set date. Notably, these timelines for defining data sets are just examples and other timelines may be used.

In one example, grouping model training step 212 may include creating user-specific models that are personalized to each user for which there is sufficient data. For example, if a user has sufficient travel data that is already labeled as business or personal, then a personalized grouping model may be trained during step 212. In another example, grouping model training step 212 may include creating multi-user (e.g., industry-specific) models. Such models may be created when supplementary data 206 collected during the data collection step 202 enables matching users by shared attributes, such as industry. For example, a new user in the ride-share industry may not have sufficient personal travel data to train a user-specific model, but the travel data marked as business or personal by other users in the same industry may provide a basis for training models applicable to the new user. Consequently, even new users with small user-specific data sets benefit from the creation of multi-user (e.g., industry) models.

In yet another example, grouping model training step 212 may include creating a user-specific model based on another user that is similar to the user according to supplementary data 206. For example, one or more attributes of a new user (e.g., industry) without significant travel data may match one or more existing users with significant travel data, and this may form the basis of creating an initial personalization model for the new user based on the existing user with matching attributes. So a new user starting to capture ride-sharing travel data may benefit from a user-specific model based on another user with significant ride-sharing travel data. In this regard, ride-sharing is just one example, and users may be matched based on many other attributes.

The output of the grouping model training step 212 may include a plurality of grouping models, including user-specific and multi-user specific grouping models. For example, each grouping model may comprise one or more patterns that indicate if travel data (e.g., a trip record) should be labeled in one way or another, such as business or personal. If a specific user always labels trips from location A to location B as business-related, grouping model training step 212 may identify that recurrence as a pattern forming part of a grouping model for the user. As another example, the same user may always mark trips taken over weekends as personal, and thus grouping model training step 212 may identify another pattern forming another part of the grouping model for the user.

Each personalization model may comprise one or more patterns that indicate how a personalization score should be calculated for a group based on the features of the group. In some embodiments, personalization models use weighted scoring methods to determine personalization scores based on weights assigned to particular group features.

At step 214, the trained grouping models are used to predict groups based on received data, such as travel data. For example, user-specific travel data may be provided to a user-specific grouping model to predict groups of the travel data, such as groups of business related trip records.

The grouping model predictions made at step 214 may be utilized by user applications, such as personal or business finance applications. In some cases, such applications include graphical user interfaces to present the predicted groups to the user. The user may review the predicted groups and either confirm the entire group, confirm part of the group, or disconfirm the entire group. The grouping model predictions at step 214 may result in user feedback 216A (e.g., which may include feedback regarding the groups, such as user interactions with groups).

User feedback 216A is used in personalization model training step 220. Personalization model training step 220 may include training personalization models based on whether or not user feedback is favorable to certain groups (e.g., groups with particular group features). As described above with respect to FIG. 1, personalization models may be trained according to weighted scoring techniques to assign personalization scores to groups.

At personalization model prediction step 222, groups (e.g., groups of travel records output by grouping models during grouping model prediction step 214) are provided to personalization models. The personalization models output prediction scores for the groups. For example, a personalization model may use a weighted scoring technique to predict a personalization score for each group that is input to the personalization model. The personalization scores output by the personalization model are used to determine which groups to display to a user, an order in which to display groups, and/or a method of providing groups to the user (e.g., within the application, via a push notification, or another method). In certain embodiments, the personalization scores are provided along with the groups to the application, and the application displays the groups via a user interface based on the personalization scores.

The user may interact with the groups displayed based on the personalization scores, and the user interactions may indicate whether or not the user response to each group was favorable. Personalization model predictions at step 222 may result in user feedback 216B, which may include all user interactions with the groups.

User feedback 216A and 216B may be used to further refine the models, such as by providing additional labeled data of known correctness (i.e., ground truth data) with respect to grouping and personalization. Further, user feedback 216 may be stored in metric data repository, such as model metrics repository 218, to measure overall performance of the grouping and personalization models and other aspects of process 200. For example, metrics such as precision and recall may be calculated for each user-specific model as well as each multi-user model. In some cases, the median performance of all individual grouping and personalization models may indicate the overall performance a system for intelligently providing personalized groups of travel data for group review, such as described with respect to FIG. 1.

Figure 3A:
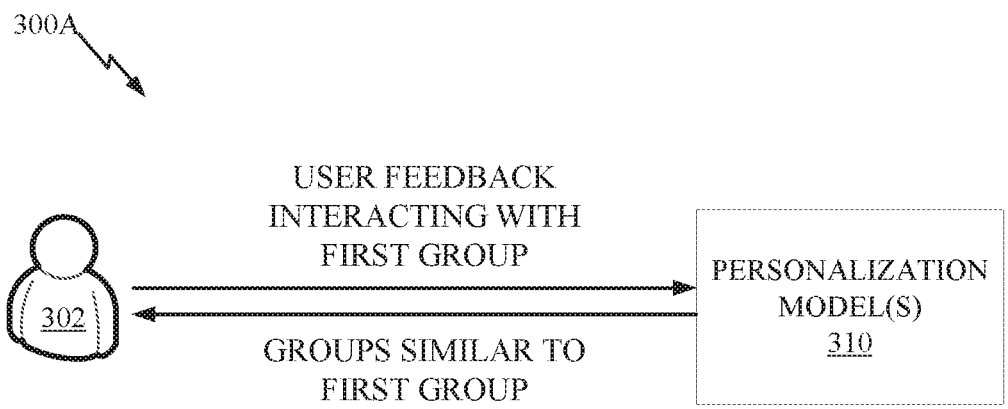
FIGS. 3A and 3B depict process flows for providing personalized groups of travel data for review by users.
Figure 3B:
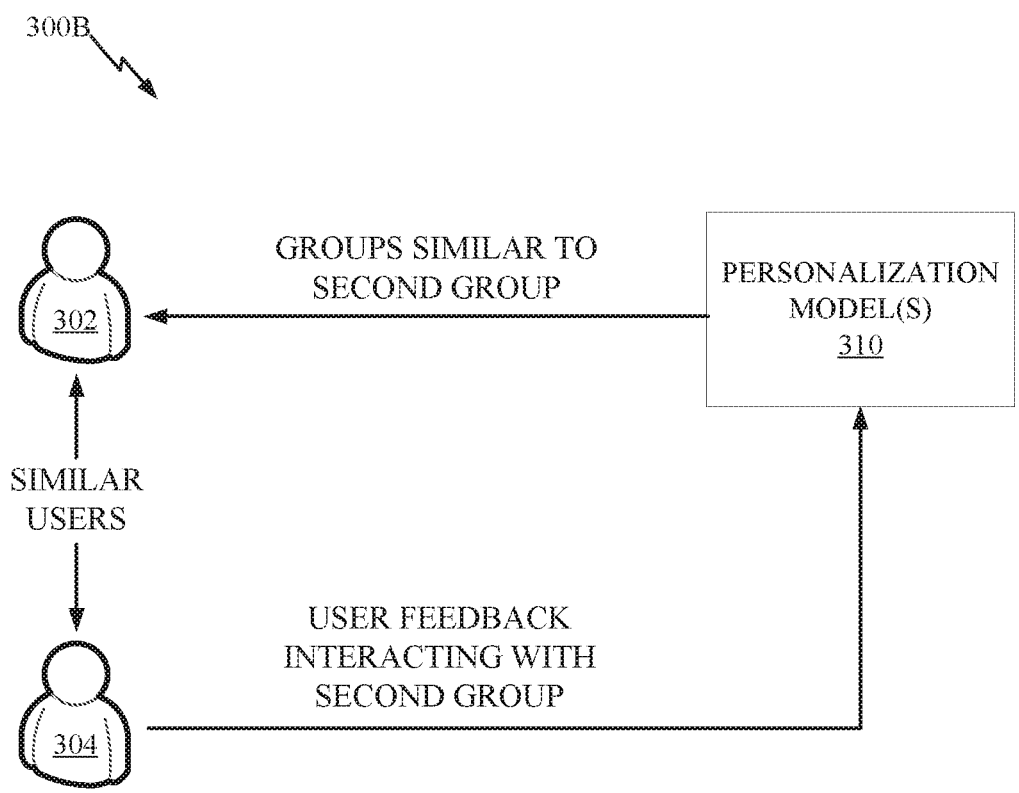

FIGS. 3A and 3B depict example process flows for providing personalized groups of travel data for review by users. In particular, FIG. 3A depicts a process flow for user-specific personalization of groups and FIG. 3B depicts a process flow for multi-user-specific personalization of groups.

FIG. 3A depicts an example 300A including user 302, which may represent a user of an application such as a personal or business finance application. User 302 provides user feedback interacting with a first group of travel data, and the user feedback is received by personalization model(s) 310. Personalization model(s) 310 determine personalization scores for groups of travel data. Personalization model(s) 310 are trained based on the user feedback from user 302 and, as a result, assign high personalization scores to groups that are similar to the first group. For example, a plurality of groups of travel data may be provided to personalization model(s) 310, and groups that share common group features with the first group may be assigned high personalization scores by personalization model(s) 310. The groups that are assigned high personalization scores by personalization model(s) 310 (e.g., groups that are similar to the first group) are provided back to user 302 for review. As such, the user may be presented with groups that are similar to a group which the user previously responded favorably to. In some embodiments, the groups are presented to the user via a user interface of the application. In certain embodiments, the groups may be provided to the user via a push notification to a mobile device through which the user accesses the application.

FIG. 3B depicts an example 300B, which includes two users 302 and 304 that are similar, such as because users 302 and 304 share common characteristics (e.g., industry, length of use of the application, frequency of accessing the application, and/or other characteristics). User 304 provides user feedback interacting with a second group of travel data, and the user feedback is received by personalization model(s) 310. Personalization model(s) 310 are trained based on the user feedback from user 304 and, as a result, assign high personalization scores to groups that are similar to the first group (e.g., for users that are similar to user 304). Because users 302 and 304 are similar, personalization model(s) 310 assigns high personalization scores to groups that are similar to the second group for providing to user 302. As such, user 302 is provided with groups that are likely to be of interest based on the similarity between user 302 and 304.

The multi-user technique for providing personalized groups of travel data shown in FIG. 3B is particularly useful in a "cold start" case, such as where user 302 has not yet provided sufficient group feedback to train a personalization model that is user-specific.

Figure 4A:
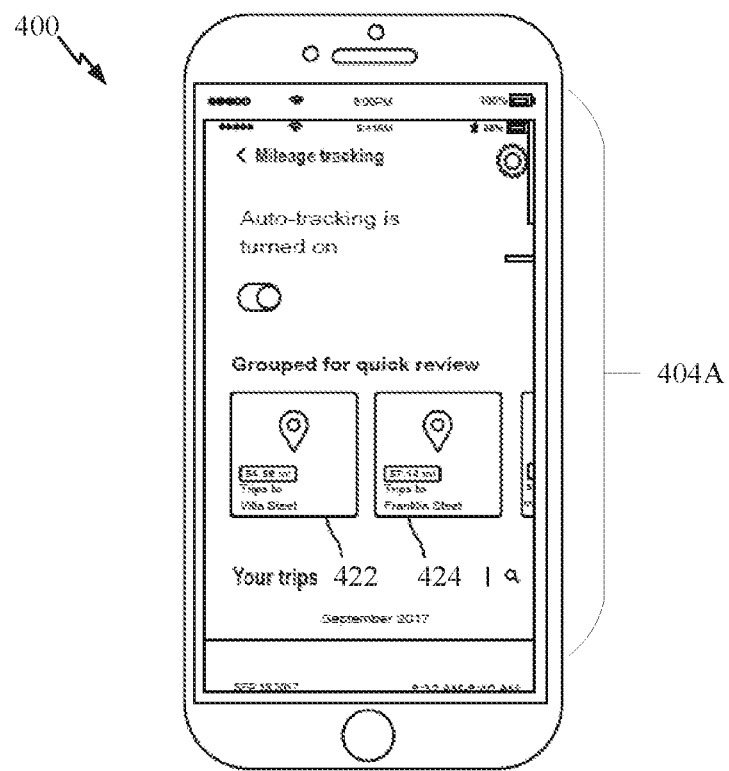
FIGS. 4A and 4B depict examples of a user interface for performing review of personalized groups of travel data.
Figure 4B:
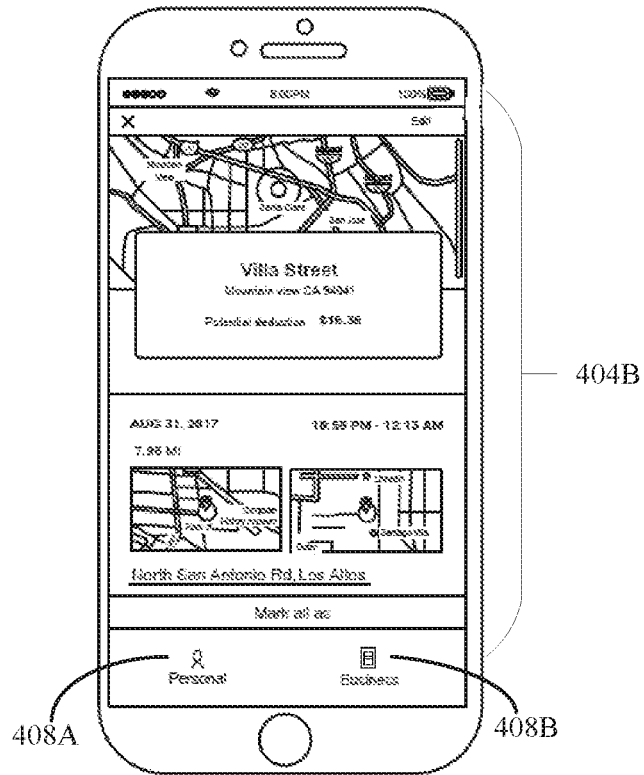

FIGS. 4A-4B depict examples of a user interface 400 for performing review of personalized groups of travel data, such as trip records.

In particular, FIG. 4A shows a screen 404A of a user interface 400 of an application that runs on a mobile device, such as mobile device 102 described with respect to FIG. 1. In some examples, the application may be a personal or business finance application. User interface 400 includes user interface elements 422 and 424 that relate to personalized groups of travel data described with respect to FIG. 1 and grouping and personalization model prediction steps 214 and 222 described with respect to FIG. 2. In the depicted example, user interface element 422 relates to a group of travel data that was grouped together by a grouping model (e.g., based on a common end location of "Villa Street") and assigned a personalization score by a personalization model such as described above. User interface element 424 relates to a second group of travel that was grouped together by a grouping model (e.g., based on a common end location of "Franklin Street") and assigned a personalization score by a personalization model such as described above. For example, the groups summarized by user interface elements 422 and 424 may have been selected for display via the user interface and ordered based on the personalization scores of the groups.

When the user selects one of user interface elements 422 and 424, the corresponding group of trip records is displayed for review by the user. For example, if the user selects user interface element 422, then screen 404B of user interface 100 in FIG. 4B may be displayed.

FIG. 4B depicts another screen 404B of user interface 400 in which additional user interface elements are demonstrated. In certain embodiments, screen 404B is displayed after user interface element 422 of FIG. 4A is selected.

Screen 404B lists the trips in a group of trip records that was chosen for display based on a personalization score of the group (e.g., determined by a personalization model). For example, the trips may have been grouped based on a common end location (e.g., Villa Street). Screen 404B includes a scroll bar that allows the user to scroll to view all of the trips in the group. Screen 404B also includes a "potential deduction" amount which indicates the amount that the user could potentially deduct in business expenses based on the trips in the group if the user labels all trips in the group as business. In the example of FIG. 4B, the group of trip records has been grouped by similarity by the grouping model, but the label of the group is up to the user to determine via use of one of user interface elements 408a and 408b, which in this case are buttons for labeling all trip records in the group as either "Personal" (via button 408a) or as "Business" (via button 408b).

When a user interacts with the group, such as by accessing the group (e.g., via user interface element 422 in FIG. 4A), scrolling through the group in screen 404B, or selecting to "Mark all as Personal" or "Mark all Business" in user interface 400, the underlying application may send feedback (e.g., related to the correctness of the personalization and/or grouping) to a remote application server, such as a server hosting production database 106 in FIG. 1. For example, the feedback may be in the form of labeled travel data (such as trip records) and/or group feedback (e.g., user interactions with groups) that can be used to further train and refine models, as described with respect to model training module 112 in FIG. 1, and as described with respect to user feedback 216 and grouping and personalization model training steps 212 and 220 in FIG. 2, above. Further, as described above, because the prediction models can be user-specific, such feedback helps to further customize the user-specific grouping and personalization models to the user's trip and interaction habits.

As displayed in the example of FIG. 4B, the amount of potential tax savings indicated in screen 404B may be expected to be higher (for example, as compared to individual or non-personalized review of trip records) when a user can quickly and reliably label groups of trip records in a manner that is consistent with the user's preferences and characteristics (e.g., based on personalization scores).

Though FIGS. 4A-4B depict a user interface 400 on a mobile device, the same concepts of providing personalized groups of travel data are equally applicable to other types of computing devices, such as tablets, laptop and desktop computers, smart wearable devices, and other electronic devices with display and user input capabilities.

Figure 5:
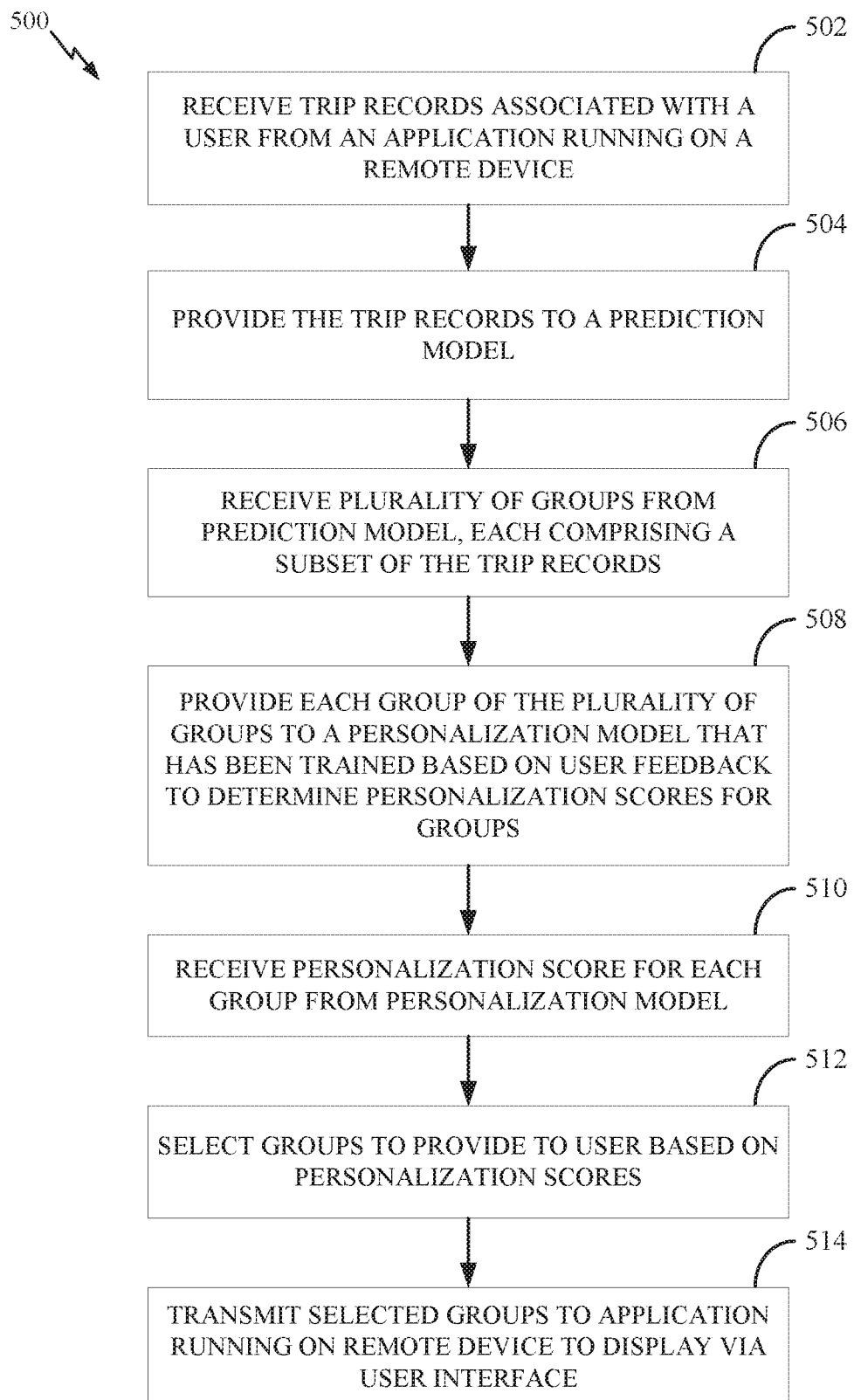
FIG. 5 depicts a method for providing personalized groups of travel data for review through a user interface.

FIG. 5 depicts a method 500 for providing personalized groups of travel data to a user interface of an application.

Method 500 begins at step 502 with receiving trip records from an application running on a remote device. The trip records may be like travel data 204 described above with respect to FIG. 2. For example, each trip record of the trip records comprises at least a start location, an end location, a trip mileage associated, and a time associated with a trip.

The remote device may be any sort of external computing device that is reachable via a data connection. In some embodiments, the remote device may be mobile device, such as a smartphone, or such as described above with respect to FIG. 1. In other embodiments, the remote device may be a laptop or desktop computer, server, or other non-mobile computing resource.

Method 500 then proceeds to step 504 with providing the trip records to a prediction model such as a grouping model described with respect to FIGS. 1 and 2.

Method 500 then proceeds to step 506 with receiving a plurality of groups from the prediction model, each group comprising a subset of the trip records. For example, each group may be a grouping of trip records based on one or more grouping criteria as described with respect to FIGS. 1 and 2.

Method 500 then proceeds to step 508 with providing each group of the plurality of groups to a personalization model that has been trained based on user feedback to determine personalization scores for groups. For example, the personalization model may determine a personalization score for each group that indicates the degree to which the group is likely to correspond to the user's characteristics and/or preferences as described with respect to FIGS. 1, 2 and 3A-3B.

Method 500 then proceeds to step 510 with receiving a personalization score for each group from the personalization model.

Method 500 then proceeds to step 512 with selecting groups to provide to a user based on the personalization scores received at step 510. For example, the groups with the highest personalization scores or every group with a personalization score above a threshold may be selected. In some embodiments, all groups are selected (e.g., and transmitted to the application along with personalization scores), while in other embodiments, only a subset of the groups are selected (e.g., based on a personalization score threshold).

Method 500 then proceeds to step 514 with transmitting the selected groups to the application running on the remote device to be displayed via a user interface as described with respect to FIGS. 1-4B. In certain embodiments, the selected groups are transmitted along with the personalization scores for the selected groups. The personalization scores may be used by the application to determine which groups to display (e.g., if the application only displays a limited number of groups) and/or the order in which to display the groups.

Though not depicted in FIG. 5, in some examples, method 500 may further include creating one or more group features from each of the plurality of groups, wherein each group provided to the personalization model includes the one or more group features, and wherein each of the one or more group data features is an input to the personalization model.

In some examples, method 500 may further include receiving supplementary data, such as supplementary data 206 described above with respect to FIG. 2, associated with a user of the application. The supplementary data may be used for creating one or more supplementary data features based on the supplementary data, wherein each of the one or more supplementary data features is an input to the prediction model and/or the personalization model. The supplementary data features may then be provided to the prediction model to improve the predictive capability of the model.

In some examples of method 500, the travel data and the supplementary data are associated with a user of the application, and the prediction model and the personalization model is specific to the user.

In some examples, method 500 may further include the personalization score for each group of the plurality of groups being determined by the personalization model based on weights associated with the one or more group features of each group.

In some examples, method 500 may further include receiving user feedback from the application running on the remote device. Thereafter, the user feedback is provided to the model training module to further refine a user-specific model or a multi-user specific model. The revised prediction model and/or personalization model (based on the user feedback) may then provide new grouped travel data and/or personalization scores, which may then be transmitted to the application running on the remote device.

In some examples, method 500 may further include receiving a new personalization score for a group of the plurality of groups from a revised personalization model, wherein the revised personalization model is based on the user feedback. The group is then selected to provide to the user based on the personalization score, and the group is transmitted to the application running on the remote device.

In some examples, method 500 may further include calculating model metrics, such as those model metrics 218 described above with respect to FIG. 2. In one example, a model metric includes one or more of a precision metric (e.g., a number of predictions confirmed by the user to be accurate divided by the total number of predictions) and a recall metric (e.g., a number of predictions confirmed by the user to be accurate divided by the total number of predictions determined to be accurate in general, such as based on feedback from all users) based on the user feedback. In some examples, the model metrics are stored in a data repository and may be further used to refine various prediction models. For example, where a model metric is insufficient compared to a threshold, a model may be re-trained or an alternate model may be used for a user, such as a multi-user model. This may be useful where, for example, a new user has not yet provided enough travel data or user feedback to train a model of sufficient performance according to predetermined performance thresholds.

In some examples, an apparatus, including a memory comprising executable instructions and a processor in data communication with the memory and configured to execute the executable instructions, may be configured to cause the apparatus to perform a method for providing personalized groups of travel data to a user interface of an application, such as method 500 (or any combination of the steps described above with respect to method 500).

In some examples, a non-transitory computer-readable medium comprising instructions that when executed by a processor of an apparatus cause the apparatus to perform a method for providing personalized groups of travel data to a user interface of an application, such as method 500 (or any combination of the steps described above with respect to method 500).

Figure 6:
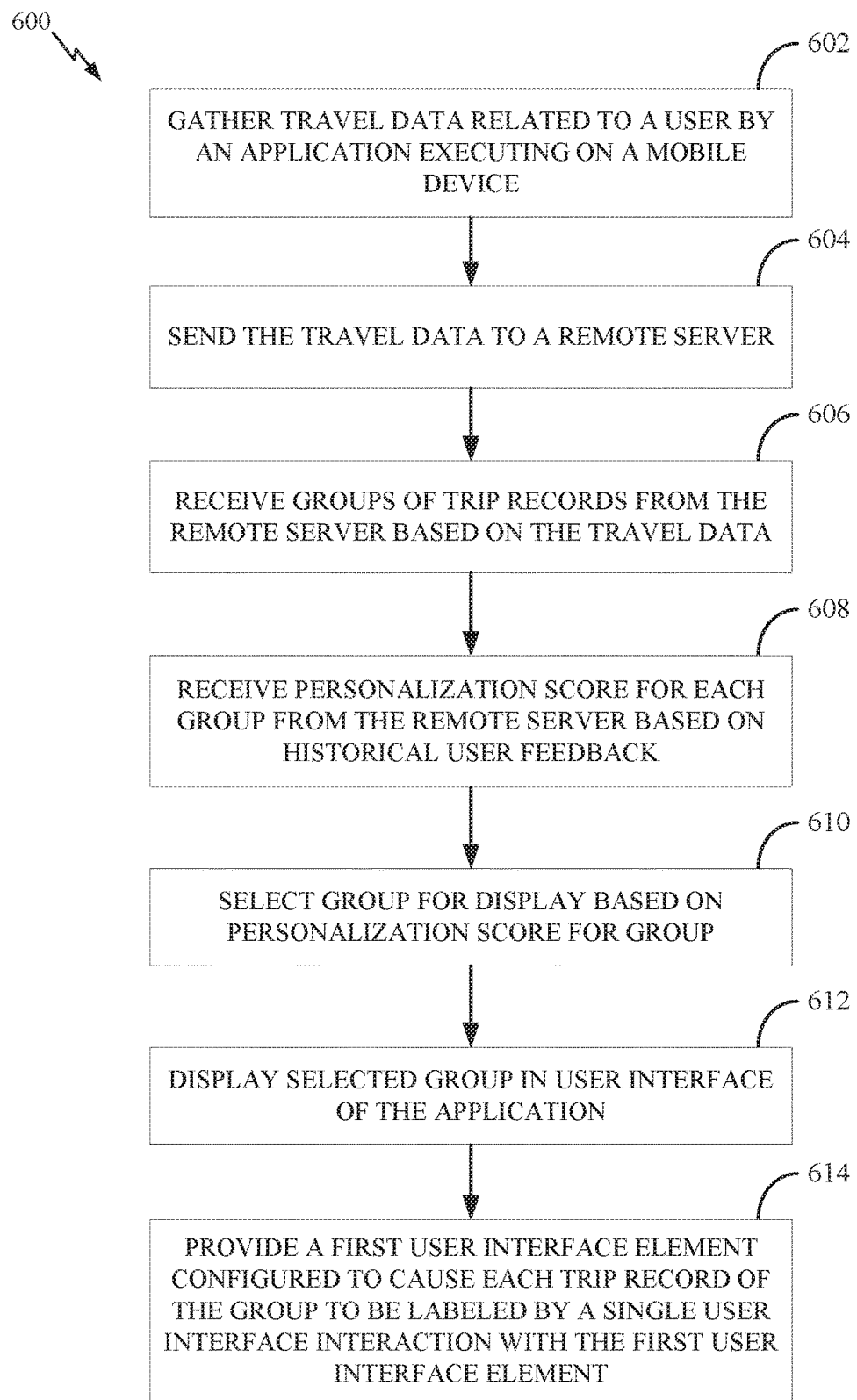
FIG. 6 depicts a method for providing personalized groups of travel data in a user interface of an application.

FIG. 6 depicts a method 600 for providing personalized groups of travel data in a user interface of an application. In some examples, the user interface relates to a mobile application running on a mobile device, such as a smartphone.

Method 600 beings at step 602 with gathering travel data related to a user by an application executing on a mobile device. In some examples, gathering the travel data includes using a satellite-based location determination capability of the mobile device, such as a Global Positioning System (GPS), Global Navigation Satellite System (GLONASS), or other similar satellite-based positioning system. The travel data may be like travel data 204 described above with respect to FIG. 2. In some examples, gathering travel data includes, for each trip of a plurality of trips, one or more of: determining a start location of the trip; determining an end location of the trip; determining a mileage of the trip; and determining a start and end time associated with the trip.

Method 600 then proceeds to step 604 with sending the travel data to a remote server. For example, the travel data may be gathered by a mobile device, such as mobile device 102 described with respect to FIG. 1, and then sent to a remote server, such a remote server hosting a production database like production database 106 in FIG. 1.

Method 600 then proceeds to step 606 with receiving groups of trip records from the remote server, wherein the groups of trip records are based on the travel data sent to the remote server. For example, as depicted in FIG. 1, mobile device 102 receives groups of travel data from production database 106.

Method 600 then proceeds to step 608 with receiving a personalization score for each groups from the remote server based on historical user feedback. For example, the personalization score may be a user-specific or multi-user-specific prediction model that determines a personalization score for each group, and the personalization scores may be based, at least in part, on historical user feedback (e.g., group feedback from the user or a plurality of users) as described with respect to FIGS. 1-5.

Method 600 then proceeds to step 610 with selecting a group for display based on the personalization score for the group. For example, the group with the highest personalization score may be selected for display.

Method 600 then proceeds to step 612 with displaying the selected group of trip records in a user interface of the application. For example, the group may be displayed in a user interface like user interface 400 described with respect to FIGS. 4A and 4B.

Method 600 then proceeds to step 614 with providing a first user interface element configured to cause each trip record of the group to be labeled by a single user interface interaction with the first user interface element. For example, the first user interface element may be a button like 408a or 408b in FIG. 4A, which in this example are configured for labeling all trip records in the group as either "Personal" (via button 408a) or as "Business" (via button 408b).

Though not depicted, method 600 may further include selecting a second group of the plurality of groups based on the personalization score for the group and initiating a communication that is provided to the user separately from the application, wherein the communication relates to the second group. The communication may be a push notification provided to a home screen of the mobile device. It is noted that a push notification related to any group may potentially be provided to the user. In some embodiments, push notification are only sent for groups that have a personalization score above a threshold.

Though not depicted, method 600 may further include detecting a user interface interaction with the first user interface element, such as a button like 408a or 408b in FIG. 4A, and thereafter transmitting user feedback to the remote server based on the user interface interaction. For example, the user interface interaction could indicate that the group of travel data is correct and/or of interest to the user based on the user selecting a button to label all of the grouped travel data with the same label (e.g., business or personal).

Though not depicted, method 600 may further include receiving an additional group of trip records from the remote server, wherein the group is based on the travel data sent to the remote server. A personalization score may be received for the additional group from the remote server, wherein the personalization score is based on the user feedback. The additional group may be displayed in the user interface of the application based on the personalization score.

In some examples, method 600 further includes the historical user feedback comprising feedback from other users that are determined to be similar to the user. For example, the other users may be determined to be similar to the user based on the other users sharing one or more characteristics with the user as described with respect to FIGS. 1-5.

In some examples, an apparatus, including a memory comprising executable instructions and a processor in data communication with the memory and configured to execute the executable instructions, may be configured to cause the apparatus to perform a method for providing personalized groups of travel data in a user interface of an application, such as method 600 (or any combination of the steps described above with respect to method 600).

In some examples, a non-transitory computer-readable medium comprising instructions that when executed by a processor of an apparatus cause the apparatus to perform a method for providing personalized groups of travel data in a user interface of an application, such as method 600 (or any combination of the steps described above with respect to method 600).

Figure 7A:
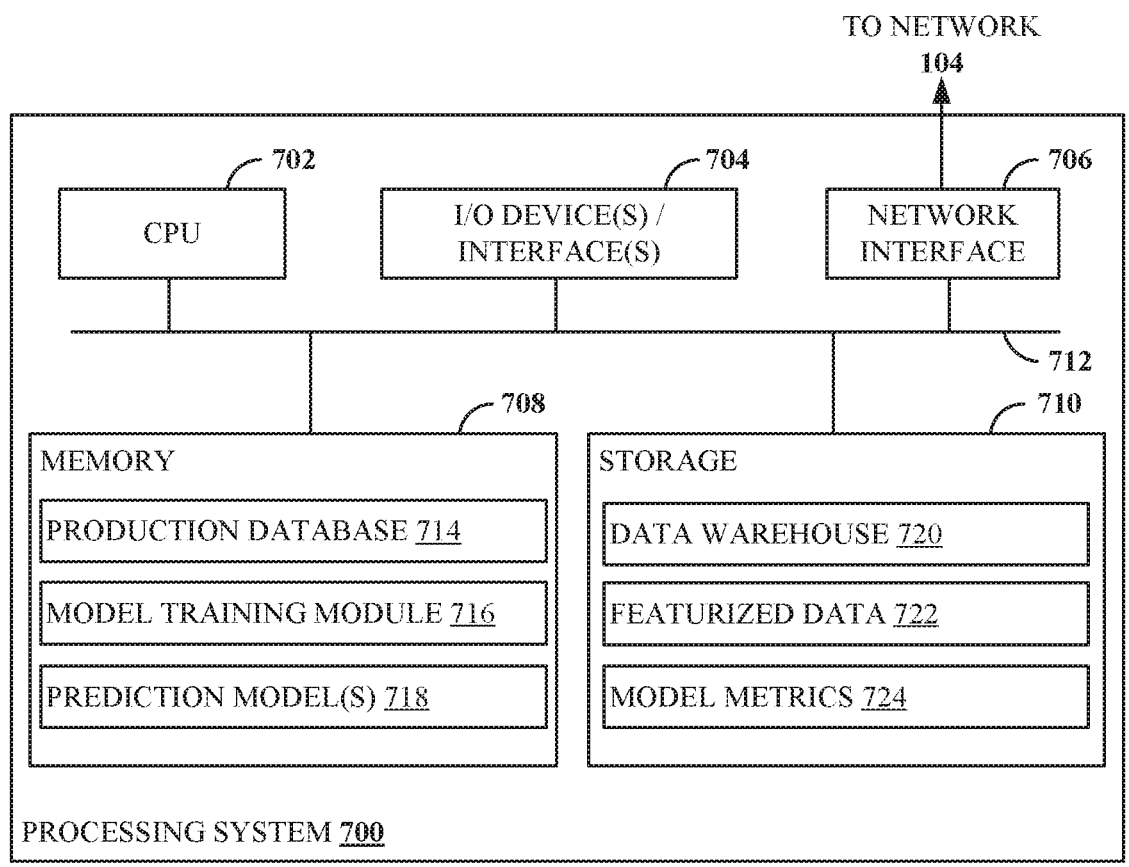
FIGS. 7A and 7B depict processing systems configured to provide personalized groups of travel data to a user interface of an application.

FIG. 7A depicts a processing system 700 configured to provide personalized groups of travel data to a user interface of an application. Processing system 700 includes a CPU 702 connected to a data bus 712. CPU 702 is configured to process computer-executable instructions, e.g., stored in memory 708 or storage 710, and to cause processing system 700 to perform methods as described herein, for example with respect to FIGS. 1, 2, 3A-B, and 5. CPU 702 is included to be representative of a single CPU, multiple CPUs, a single CPU having multiple processing cores, and other forms of processing architecture capable of executing computer-executable instructions.

Processing system 700 further includes input/output devices and interface 704, which allows processing system 700 to interface with input/output devices, such as, for example, keyboards, displays, mouse devices, pen input, and other devices that allow for interaction with processing system 700. Note that while not depicted with independent external I/O devices, processing system 700 may connect with external I/O devices through physical and wireless connections (e.g., an external display device).

Processing system 700 further includes network interface 706, which provides processing system 700 with access to external computing devices, such as described with respect to FIG. 1.

Processing system 700 further includes memory 708, which in this example includes production database 714, which may be like production database 106 described above with respect to FIG. 1. Memory 708 also includes model training module 716, which may be like model training module 112 described above with respect to FIG. 1. Memory 708 also includes one or more prediction models 718, which may be like prediction models 110 described above with respect to FIG. 1. Note that while shown as a single memory 708 in FIG. 7A for simplicity, the various aspects stored in memory 708 may be stored in different physical memories, but all accessible CPU 702 via internal data connections, such as bus 712.

Processing system 700 further includes storage 710, which in this example includes data warehouse 720, which may be like data warehouse 108 described above with respect to FIG. 1. Data warehouse 720 may store, for example, travel data and supplementary data, such as travel data 204 and supplementary data 206 described above with respect to FIG. 2. Storage 710 also includes featurized data 722, which may be like featurized data 210 described above with respect to FIG. 2. Storage 710 also includes model metrics 718, which may be like model metrics 218 described above with respect to FIG. 2. As with memory 708, a single storage 710 is depicted in FIG. 7A for simplicity, but the various aspects stored in storage 710 may be stored in different physical storages, but all accessible to CPU 702 via internal data connections, such as bus 712.

Figure 7B:
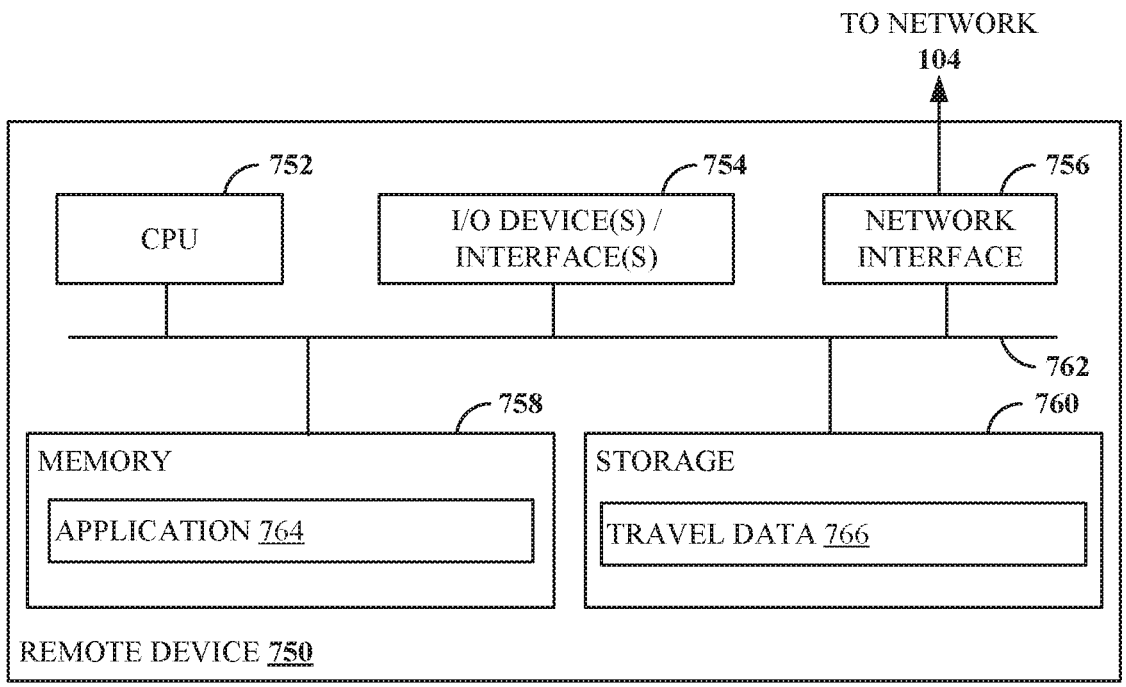

FIG. 7B depicts a remote device 750 configured to provide personalized groups of travel data in a user interface of an application. Remote device 750 includes a CPU 752 connected to a data bus 762. CPU 752 is configured to process computer-executable instructions, e.g., stored in memory 758 or storage 760, and to cause remote device 750 to perform methods as described herein, for example with respect to FIGS. 1, 2, 3A-B, and 6. CPU 752 is included to be representative of a single CPU, multiple CPUs, a single CPU having multiple processing cores, and other forms of processing architecture capable of executing computer-executable instructions.

Remote device 750 further includes input/output device and interface 754, which allow, for example, a user to interact with remote device 750. For example, a user may interact with personalized groups of travel data as described above with respect to FIGS. 4A-4B. For example, an input/output device of remote device 750 may include a touch-sensitive display screen. Note that while not depicted with independent external I/O devices, remote device 750 may likewise connect with external I/O devices through physical and wireless connections (e.g., a wireless keyboard via a short-range data connection such as Bluetooth).

Remote device 750 further includes network interface 706, which provides processing system 700 with access to external computing devices, such as described with respect to FIG. 1.

Remote device 750 further includes memory 758, which in this example includes application 765, which may be, for example, a personal or business finance application with a trip tracking capability, as described above with respect to FIGS. 4A and 4B. Note that while shown as a single memory 758 in FIG. 7B for simplicity, the various aspects stored in memory 758 may be stored in different physical memories, but all accessible to CPU 752 via internal data connections, such as bus 762.

Remote device 750 further includes storage 760, which in this example includes travel data 766. In some examples, travel data 766 comprises labeled and/or unlabeled trip records as described above. As with memory 758, a single storage 760 is depicted in FIG. 7B for simplicity, but the various aspects stored in storage 760 may be stored in different physical storages, but all accessible to CPU 752 via internal data connections, such as bus 762.

The content and configuration of processing system 700 in FIG. 7A and remote device 750 in FIG. 7B are just one example, and other configurations are possible.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing personalized groups of travel data to a user interface of an application, comprising:
   receiving unlabeled trip records associated with a user from an application running on a remote device;
   providing the unlabeled trip records to a prediction model;
   receiving a plurality of groups from the prediction model, wherein each group of the plurality of groups comprises a subset of the unlabeled trip records that has been grouped based on shared features for labeling together by the user via the user interface;
   providing one or more inputs to a personalization model based on one or more group criteria of each group of the plurality of groups, wherein the personalization model has been trained, based on historical user interface interactions with groups that have certain group criteria, and that were previously output by the prediction model and presented to one or more users for review, to determine personalization scores for the plurality of groups;
   receiving a personalization score for each group of the plurality of groups from the personalization model;
   selecting two or more groups of the plurality of groups to provide to the user based on the personalization score for each of the two or more groups;

determining, based on the personalization score for each of the two or more groups, an order for displaying the two or more groups via the user interface to the user for labeling the unlabeled trip records; and transmitting the two or more groups to the application running on the remote device to be displayed in the order via the user interface.

2. The method of claim 1, wherein the personalization score for each group of the plurality of groups is determined by the personalization model based on weights associated with the one or more group criteria of each group of the plurality of groups.

3. The method of claim 1, further comprising:
receiving supplementary data associated with the user; and
creating one or more supplementary data features based on the supplementary data, wherein each of the one or more supplementary data features is an input to the personalization model.

4. The method of claim 1, further comprising:
transmitting the personalization score for each of the two or more groups to the application running on the remote device,
wherein the two or more groups are displayed via the user interface based on the personalization score for each of the two or more groups.

5. The method of claim 1, wherein the remote device is a smartphone.

6. The method of claim 1, wherein the one or more group criteria of each group of the plurality of groups comprise one or more of:
a trip location;
a trip time; or
a number of trips.

7. The method of claim 1, further comprising:
receiving user feedback from the application running on the remote device;
providing the user feedback to a model training module;
receiving a new personalization score for a group of the plurality of groups from a revised personalization model, wherein the revised personalization model is based on the user feedback;
selecting the group to provide to the user based on the personalization score; and
transmitting the group to the application running on the remote device.

8. The method of claim 7, further comprising:
calculating a model recall metric based on the user feedback;
calculating a model precision metric based on the user feedback; and
storing the model recall metric and model precision metric in a metric data repository.

9. An apparatus for providing personalized groups of travel data to a user interface of an application, comprising:
a memory comprising executable instructions; and
a processor in data communication with the memory and configured to execute the executable instructions and cause the apparatus to perform a method, the method comprising:
receiving unlabeled trip records associated with a user from an application running on a remote device;
providing the unlabeled trip records to a prediction model;
receiving a plurality of groups from the prediction model, wherein each group of the plurality of groups comprises a subset of the unlabeled trip records that has been grouped based on shared features for labeling together by the user via the user interface;
providing one or more inputs to a personalization model based on one or more group criteria of each group of the plurality of groups, wherein the personalization model has been trained, based on historical user interface interactions with groups that have certain group criteria and that were previously output by the prediction model and presented to one or more users for review, to determine personalization scores for the plurality of groups;
receiving a personalization score for each group of the plurality of groups from the personalization model;
selecting two or more groups of the plurality of groups to provide to the user based on the personalization score for each of the two or more groups;
determining, based on the personalization score for each of the two or more groups, an order for displaying the two or more groups via the user interface to the user for labeling the unlabeled trip records; and
transmitting the two or more groups to the application running on the remote device to be displayed in the order via the user interface.

10. The apparatus of claim 9, wherein the personalization score for each group of the plurality of groups is determined by the personalization model based on weights associated with the one or more group criteria of each group of the plurality of groups.

11. The apparatus of claim 9, wherein the method further comprises:
receiving supplementary data associated with the user; and
creating one or more supplementary data features based on the supplementary data, wherein each of the one or more supplementary data features is an input to the personalization model.

12. The apparatus of claim 9, wherein the one or more group criteria of each group of the plurality of groups comprise one or more of:
a trip location;
a trip time; or
a number of trips.

13. A non-transitory computer-readable medium comprising instructions that when executed by a processor of an apparatus cause the apparatus to perform a method for providing personalized groups of travel data in a user interface of an application, the method comprising:
gathering travel data related to a user by an application executing on a mobile device;
sending the travel data to a remote server;
receiving a plurality of groups of unlabeled trip records from the remote server, wherein the plurality of groups were determined using a prediction model based on the travel data sent to the remote server and comprise subsets of the unlabeled trip records that have been grouped based on shared features for labeling together by the user via the user interface;
receiving a personalization score for each group of the plurality of groups from the remote server, wherein the personalization score for each group was determined using a personalization model, and wherein the personalization model has been trained, based on historical user interface interactions with groups that have certain group criteria and that were previously output by the prediction model and presented to one or more users for for review, to determine personalization scores for the plurality of groups;

determining, based on a personalization score for each group of the plurality of groups, an order for displaying the plurality of groups via the user interface to the user for labeling the unlabeled trip records;

displaying the plurality of groups in the order via the user interface; and providing a first user interface element configured to cause each trip record of a first group of the plurality of groups to be labeled by a single user interface interaction with the first user interface element.

14. The non-transitory computer-readable medium of claim 13, wherein the mobile device is a smartphone.

15. The non-transitory computer-readable medium of claim 13, wherein the historical user interface interactions comprise feedback from other users that share one or more characteristics with the user.

16. The non-transitory computer-readable medium of claim 15, wherein the one or more characteristics relate to use of the application by the user and the other users.

17. The non-transitory computer-readable medium of claim 13, wherein the method further comprises
initiating, based on a respective personalization score of a second group of the plurality of groups, a communication that is provided to the user separately from the application, wherein the communication relates to the second group.

18. The non-transitory computer-readable medium of claim 17, wherein initiating the communication that is provided to the user separately from the application comprises: providing a push notification related to the second group to a home screen of the mobile device.

19. The non-transitory computer-readable medium of claim 13, wherein the method further comprises:

detecting a user interface interaction with the first user interface element; and transmitting user feedback to the remote server based on the user interface interaction.

20. The non-transitory computer-readable medium of claim 19, wherein the method further comprises:

receiving a third group of trip records from the remote server, wherein the third group of trip records is based on the travel data sent to the remote server;

receiving a third personalization score for the third group from the remote server, wherein the third personalization score is based on the user feedback; and displaying the third group of trip records in the user interface of the application based on the third personalization score.

* * * * *